United States Patent [19]
Deckert

[11] 3,812,280
[45] May 21, 1974

[54] ELECTRICAL CAPACITORS WITH VENTED CLOSURES

[75] Inventor: Andreas Deckert, Heidenheim, Germany

[73] Assignee: Siemens Aktiengesellschaft, Berlin & Munich, Germany

[22] Filed: Apr. 24, 1973

[21] Appl. No.: 354,006

[30] Foreign Application Priority Data
Apr. 27, 1972  Germany............................ 2220752

[52] U.S. Cl........ 174/52 S, 220/44 C, 220/DIG. 27, 317/230
[51] Int. Cl............................................. H01g 9/12
[58] Field of Search .......... 174/52 S; 317/230, 242; 220/44 R, 44 C, DIG. 27

[56] References Cited
UNITED STATES PATENTS
3,197,547   7/1965   Peace............................. 317/230 X
3,439,234   4/1969   Braiman........................... 317/230

Primary Examiner—E. A. Goldberg
Attorney, Agent, or Firm—Hill, Sherman, Meroni, Gross & Simpson

[57] ABSTRACT

An electrical capacitor having a sealed housing and a number of pressure relief orifices formed in the housing. A resilient annular valve disc overlies the orifices and a rigid washer like member holds the resilient disc in place against the housing. The rigid member has a number of recesses located in the vicinity of respective orifices to permit the resilient member to be lifted to vent pressure developed inside the capacitor.

9 Claims, 3 Drawing Figures

PATENTED MAY 21 1974  3,812,280

ELECTRICAL CAPACITORS WITH VENTED CLOSURES

BACKGROUND OF THE INVENTION

Field of the Invention

The field of art to which this invention pertains is electrical capacitors and in particular to means for venting such capacitors to relieve excess pressure within the capacitor.

SUMMARY OF THE INVENTION

It is an important feature of the present invention to provide an improved vented electrical capacitor.

It is another feature of this invention to provide means for venting a predetermined pressure from the interior of a capacitor.

It is an object of the present invention to provide a capacitor having a number of orifices and a resilient valve member sealing the orifice to permit controlled release of pressure within the capacitor.

It is another feature of the present invention to provide a capacitor as described above wherein the resilient valve member is an annular disc and wherein a rigid disc overlies the valve member to hold the same into engagement with the valve body.

It is also an object of this invention to provide a capacitor as described above wherein the rigid disc has a series of recesses or notches in the periphery thereof to coincide with respective orifices to permit controlled release of pressure developed within the capacitor.

It is a further object of the invention to provide a capacitor as described above wherein centering pips are provided adjacent the inner periphery of the rigid disc.

DESCRIPTION OF THE PREFERRED EMBODIMENT

Figure 1:
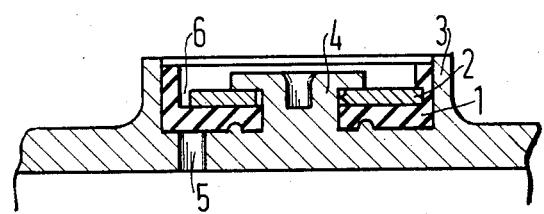
FIG. 1 is a sectional view of a capacitor housing taken along lines indicated at I—I in FIG. 2.

The present invention relates to electrical capacitors and more particularly to such capacitors having a pressure-relief valve in the housing thereof serving to relieve excess pressure developing in the housing.

In electrical capacitors, particularly of the electrolytic type, both during the forming step and also during operation, gas is produced. If the housing of the capacitor is closed in such a way that pressure equilibrium with the ambient atmosphere cannot take place, then the housing may burst as a consequence of the development of a very high internal pressure, and thus render the capacitor unusable.

In order to achieve pressure compensation with the ambient atmospheric pressure, a wide variety of devices have been proposed. In one such device, for example, an orifice in the capacitor housing is closed off in gas-tight fashion by means of a foil or diaphragm which ruptures when a specific superatmospheric pressure has developed in the housing. It is a disadvantage of such a system, however, that after the pressure-relief safety device has operated, the capacitor housing contains an opening through which moisture can penetrate over a period of time and also through which electrolyte can escape, thus rendering the capacitor unusable.

German Patent Specification No. 1,564,673 as laid open to public inspection describes a pressure-relief safety device in which an annular elastic valve lip bears against an annular external shoulder forming a valve dome and closes off a valve orifice. With any increase in pressure in the interior of the housing, pressure equilibrium with the ambient atmospheric pressure is secured by the lifting away of the valve lip from the dome. After pressure equilibrium has been achieved, the valve lip again seals off the interior of the capacitor housing in gas-tight fashion. In order to provide the requisite loading, the valve lip is forced by a rivet through a washer into contact with the housing. The diameter of this washer must be such that the edge of the valve lip can lift away from the dome. In this design of pressure-relief valve, the valve lip is not positively pressed against the edge of the valve dome but merely rests against it with a force depending on the elasticity of the particular material of which the valve lip is made. Consequently, in this design, control of the internal pressure at which the pressure-relief valve operates is difficult to achieve.

According to the invention, there is provided an electrical capacitor provided with a pressure-relief valve for relieving excess pressure developing within the capacitor housing, comprising a valve orifice formed in the housing and adapted to be closed by an annular valve member of elastic material having a peripheral lip portion which in the closed position of the valve is biased into contact with an annular shoulder, formed in the outer surface of the casing, by a backing washer, wherein said backing washer has a diameter such that said lip portion is positively pressed into contact with said shoulder by said backing washer; and wherein said backing washer is provided with one or more outer peripheral recesses at which said lip can be lifted from contact with said shoulder to permit the escape of excess pressure developed in said housing.

This arrangement has the advantage that by appropriate shaping of the backing washer, the equalization of pressure between the interior of the housing and the ambient atmosphere can be made to take place at any predetermined superatmospheric pressure within the housing. Also, by appropriate design of the backing washer, it is possible to make use of the most varied materials for the valve member.

Conveniently, the backing washer is in the form of a circular ring with two chordal sections cut away to form the recess. The size of these chordal sections depends upon the elasticity of the material of the valve member. For example, they can be made larger as the material of which the valve member is made is selected to be harder, and, similarly, they can be made smaller as this material is selected to be softer. The external diameter of the backing ring is so chosen that the valve lip is pressed firmly against the shoulder on the casing forming the valve dome. Pressure balance can only be achieved at the recesses.

Alternatively, the backing washer can be designed to have segments of sawtooth shape cut out of its outer edge.

In order to ensure accurate centering of the backing washer on a rivet holding it in contact with the valve member, centering pips can be formed at its inner periphery. This can also be used to ensure that a recess at which pressure balance is effected, is located in the neighborhood of the valve orifice.

Referring to FIG. 1, the pressure-relief valve comprises a valve member 1 of elastic material having a lip portion which is pressed by a backing washer 2 against a shoulder formed by an annular projection 3 upstanding from the surface of the housing of a capacitor forming a valve dome. The valve member 1 and the washer 2 are held in place by a hollow cylindrical upward extension 4 of the housing the outer end of which is splayed outwards to hold the valve member 1 and the washer 2 in contact with the surface of the housing within the projection 3. The valve member 1 covers an orifice 5 in the housing, and the washer 2 is provided with a recess 6 in the neighborhood of this orifice so that the lip portion of the valve member 1 can lift away from the valve dome 3 at this point, when a superatmospheric pressure develops inside the housing. After pressure equalization with the ambient atmospheric pressure has been achieved, the valve member 1 again closes off the orifice 5 so that the interior of the housing is again sealed off in gas-tight fashion from the ambient atmosphere.

Figure 2:
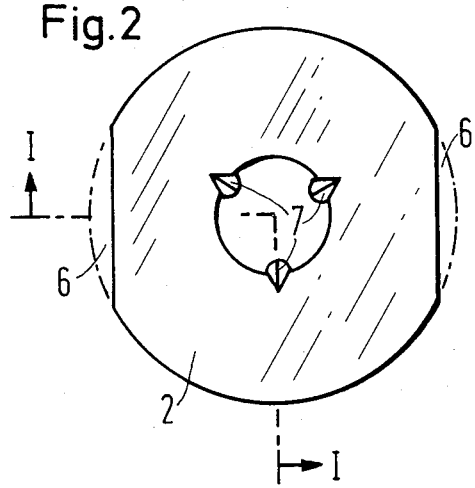
FIG. 2 is a top view of a rigid disc to hold the resilient valve member in position as shown in FIG. 1.

As shown in FIG. 2, the backing washer 2 is in the form of a circular ring, the recesses 6 taking the form of chordal sections removed at the edge of the washer 2. On the inner periphery of the backing washer, centering pips 7 are provided.

Figure 3:
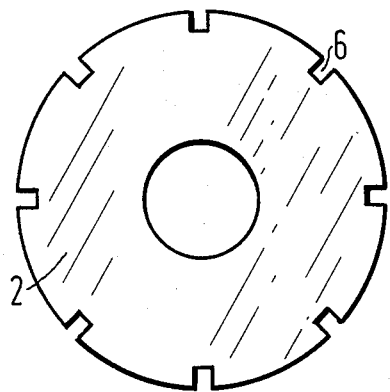
FIG. 3 is an alternate form of a disc similar to that shown in FIG. 2.

In FIG. 3, a further form of backing washer 2 is illustrated. In this case, the recesses 6 are formed in sawtooth fashion at the outer periphery of the washer 2.

What I claim is:

1. In an electrical capacitor, a housing having a valve orifice for communicating pressure from inside the capacitor to the ambient pressure, a relatively resilient member in contact with the housing and overlying the orifice for normally sealing the inside of the capacitor from the ambient atmosphere, a relatively rigid member overlying said resilient member and normally holding the same into sealing engagement with said housing, said rigid member having a peripheral recess in the vicinity of said orifice to permit said resilient member to be lifted by a predetermined pressure at the inside of said capacitor.

2. A capacitor in accordance with claim 1 wherein said resilient and rigid members are substantially annular in shape and wherein said orifice is located inside the largest circle defined by the periphery of said rigid member.

3. A capacitor in accordance with claim 2 wherein said recess comprises a chordal section of said annular member.

4. A capacitor in accordance with claim 2 wherein said recess comprises a notch formed at the periphery of said annular member.

5. A capacitor in accordance with claim 4 wherein a plurality of said notches are formed around the periphery of said rigid annular member and wherein an orifice is provided substantially at the location of each of said orifices.

6. A capacitor having a sealed housing, a valve opening in the housing, a resilient valve head closing the opening, a relatively rigid member holding the resilient member closed against the opening and said rigid member having a cutaway portion in the vicinity of the orifice to permit the valve head to be lifted by a predetermined amount of pressure developed interiorly of the capacitor.

7. A capacitor in accordance with claim 6 wherein said valve head has a planar disc portion and said rigid member overlies said planar disc portion and holds the outer periphery thereof in firm contact with said housing at all locations except in the vicinity of said orifice.

8. A capacitor in accordance with claim 7 wherein said valve head has a planar disc portion and an upstanding rim formed at the outer periphery thereof.

9. A capacitor in accordance with claim 7 wherein said rigid member is an annular disc and wherein centering pips are provided adjacent an inner periphery of said disc.

* * * * *